Patented May 13, 1952

2,596,108

UNITED STATES PATENT OFFICE 2,596,108

NITRO SUBSTITUTED PRODUCTS OF DI(ALKOXYPHENYL)ETHANE

Gino R. Treves, New York, N. Y., assignor to Schieffelin & Co., New York, N. Y., a corporation of New York No Drawing. Application April 20, 1948, Serial No. 22,237

2 Claims. (Cl. 260—488)

This invention relates to new compounds for use in chemotherapy and also to methods for preparing them.

Certain chemical compounds or chemical structures are essential metabolites for pathogenic micro-organisms and are, of course, assimilated by these organisms. In view of this fact, it is now proposed, and it is a principal object of this invention, to prepare compounds which are therapeutically active against a variety of pathogenic micro-organisms and which sufficiently resemble essential metabolites thereof in structure as to be likely to be assimilated by the micro-organisms. Another object is to provide methods for preparing these active compounds. A further object is to make available compounds, and methods for preparing them, which are useful as intermediates in the preparation of other active compounds.

The invention provides 2,2'-dialkoxy-4,4'-diaminobenzils as new and assimilable compounds of superior therapeutic activity. Alkoxy groups having from one to and including seven carbon atoms are preferred, such as the straight and branched chain groups like methoxy, ethoxy, propoxy, butoxy, isobutoxy, etc., and the ring groups like phenoxy and benzyloxy, all of such derivatives being useful as therapeutic agents or as intermediates. Of these, the methoxy derivative is to be preferred. As useful or active intermediates or derivatives of the foregoing compounds are the following acyloxy and hydroxy compounds: the alpha, beta-diacyloxy-2,2'-dialkoxy-4,4'-diaminobibenzyls and the 2,2'-dialkoxy - 4,4' - diaminohydrobenzoins. These compounds, along with the diaminobenzils, may be defined as 1,2-di(o-alkoxy-p-aminophenyl) ethane compounds in which each ethane carbon atom is substituted by an oxygen-containing radical from the class consisting of acyloxy, hydroxy, and oxygen or oxy. Other compounds are described below.

The invention also provides a process for preparing 2,2'-dialkoxy-4,4'-diaminobenzil which comprises condensing 2-alkoxy-4-nitrotoluene by passing an oxygen-containing gas through an alcoholic caustic solution of the same in the presence of a hydrogen-accepting agent capable of being re-oxidized by said oxygen-containing gas, thus forming as a condensation product 2,2'-dialkoxy-4,4'-dinitrobibenzyl, halogenating this compound by reacting the same with free halogen in the presence of a solvent to form alpha, beta-dihalo-2,2'-dialkoxy-4,4'-dinitrobibenzyl, acylating the latter compound by reacting it with a metal salt of an organic acid to form alpha, beta-diacyloxy-2,2'-dialkoxy-4,4'-dinitrobibenzyl, hydrolyzing or de-acylating the last compound by treating it with alcoholic caustic to produce 2,2'-dialkoxy-4,4'-dinitrohydrobenzoin, oxidizing the latter compound by treating it with an oxidizing agent to form 2,2'-dialkoxy-4,4'-dinitrobenzil, and reducing this compound by subjecting it to the action of a reducing agent to form 2,2'-dialkoxy-4,4'-diaminobenzil.

As additional new compounds, useful either as intermediates or as therapeutic agents, the invention makes available the nitro compounds produced in the acylating and following steps of the above described overall process, as well as the method for preparing them. These nitro compounds include alpha,beta-diacyloxy-2,2'-dialkoxy-4,4'-dinitrobibenzyl, produced during the acylating step, and in which the acyloxy and alkoxy groups may comprise such radicals as acetoxy, propionoxy, butyroxy, isobutyroxy, benzoxy, etc., in the case of acyloxy, and methoxy, ethoxy, propoxy, butoxy, isobutoxy, etc., in the case of alkoxy. Ring ether groups such as phenoxy and benzyloxy may also be present. Preferably the acyloxy and alkoxy groups contain from one to and including seven carbon atoms. The nitro compounds also include 2,2'-dialkoxy-4,4'-dinitrohydrobenzoin, produced in the deacylation or hydrolyzing step, and 2,2'-dialkoxy-4,4'-dinitrobenzil, produced in the oxidation step, and in both of which the alkoxy group may vary as just described. The foregoing nitro compounds may be described as compounds of 1,2-di(o - alkoxy - p - nitrophenyl)ethane, in which each ethane carbon atom is substituted by an oxygen-containing group selected from the class consisting of acyloxy, hydroxy and oxygen or oxy.

The new nitro and amino compounds provided by the invention may be regarded as 1,2-di-(o-alkoxy-p-X-phenyl) ethane compounds in which each ethane carbon atom is substituted by an oxygen-containing radical from the class consisting of acyloxy, hydroxy, and oxygen or oxy, and in which X is a nitrogen-containing radical from the class consisting of nitro —NO₂ and amino —NH₂. Each ethane carbon atom, it will be seen, is connected to a substituting radical through an oxygen atom.

Considering the above described overall process in a step by step manner, the starting material 2-alkoxy-4-introtoluene may contain any suitable alkoxy group, such as methoxy, ethoxy, propoxy, butoxy, isobutoxy and the like. The condensation reaction is preferably carried out at room temperatures, but the tempeature may be varied consistent with the obtaining of a commercially feasible yield in a reasonable time. The hydrogen-accepting agent should be a material which aids the condensation reaction by, as the name implies, taking up hydrogen. It should not adversely affect the starting material or the product and should be re-oxidizable in situ by means of the oxygen-containing gas. By "oxygen-containing" gas is meant one which contains free oxygen. The preferred class of hydrogen acceptors are organic compounds having at least one reducible carbonyl group, $=CO$, such as ketones, diketones, quinones, aldehydes, and the like. These compounds, which may be described as having a high oxidation potential, may be aliphatic, aromatic, mixed aliphatic-aromatic, or cycloparaffinic in character, and may include the following: o- and p-benzoquinone, cyclohexanone, acetone, anthraquinone, acetaldehyde, 1,2- and 1,4-naphthoquinones, tertiarybutylphenylketone, benzaldehyde, diphenyl ketone, cyclopentanone, diphenoquinone, etc. The preferred agent is benzoquinone. These agents may also be said to be oxidizing catalysts since they remove hydrogen from the product, are themselves reduced, and later by virtue of being re-oxidized, appear unchanged at the end of the reaction. The oxidizing gas in this step may be air, oxygen, or other oxygen-containing gas. Instead of a gaseous oxidizing agent, a liquid material such as alkali metal hypochlorite or other hypohalite may be employed.

The halogentation step is carried out with free halogen or an agent which gives rise to free halogen under the reaction conditions. In this connection, throughout the specification and claims the expression "free halogen" is intended to include elemental halogen as such and agents which supply halogen, such as N-bromosuccinimide with or without peroxide, thionyl chloride, hypohalites, and the like. Bromine is the preferred halogen. Preferably a common solvent for the alkoxynitrobibenzyl compound and the halogen is employed. As solvents, there may be mentioned such materials as acetic acid, propionic acid, other higher alkanoic acids, petroleum ether, chloroform, carbon tetrachloride, ether etc. Acetic acid is the preferred solvent. The solvent mixture may be heated to favor the reaction, the temperature ranging from about room temperature to about 150° C. Usually temperatures at which the solvent refluxes are satisfactory.

The product formed in the last step, alpha,-beta-dihalo-2,2'-dialkoxy-4,4'-dinitrobibenzyl, is then acylated with a metal salt of a monobasic organic acid. Preferably the organic acid is an alkanoic acid such as acetic, propionic, butyric, isobutyric and the like, although cyclic organic acids such as benzoic and phenylacetic may be used. The metal portion of the salt should desirably be a metal which produces a separable halide, such as sodium, potassium, lithium or other strongly electropositive metal, or preferably a metal which produces an insoluble halide, such as silver, gold, mercury, lead, thallium, molybdenum etc. The reaction is usually, but not necessarily, carried out in the presence of a solvent, such as organic acids and organic acid anhydrides, preferably of the same acid as that which is combined with the metal in the form of the metal salt. Room temperatures and higher are satisfactory for the reaction. With lower boiling solvents, boiling, say, up to 200° C., refluxing temperatures are preferred.

The deacylation or hydrolysis step may be carried out by dissolving the acylated bibenzyl compound in alcoholic caustic solution at about room temperatures or somewhat lower. Any undissolved material may be filtered off and discarded. The filtrate is then acidified with a suitable organic or inorganic acid such as dilute hydrochloric, sulfuric, formic, acetic or other acid. The precipitate which forms is the dialkoxy-dinitrohydrobenzoin.

In the oxidation step which follows, the hydrobenzoin compound may be oxidized to the dialkoxydinitrobenzil compound with an inorganic or organic oxidation agent. The temperature must be controlled during the oxidation so as to secure a reasonable reaction rate without splitting the hydrobenzoin or the benzil compound. Nitric acid at, say, room temperatures to 100° C. or more, preferably 80 to 100° C., has been found satisfactory for the oxidation step. Other suitable oxidizing agents are chromic acid, cupric sulfate, etc.

If desired, the de-acylation of the bibenzyl compound and the oxidation of the resulting hydrobenzoin compound may be carried out in a single operation by oxidizing the bibenzyl compound, say with nitric acid, directly to the benzil compound. This procedure may consume more time than the oxidation step of the foregoing paragraph, but has the advantage of eliminating one step.

For reducing the dialkoxydinitrobenzil compound to the corresponding amino compound, a variety of conventional reducing agents are useful. Hydrogen gas may be employed with or without a catalyst, although preferably a hydrogenation catalyst, such as palladium or platinum on charcoal, celite, acid-treated clay, or other carrier is used. Platinum oxide is also useful in this connection. Instead of hydrogen, ferrous sulfate in combination with ammonium hydroxide, also ammonium sulfide, ferrous hydroxide, etc. will produce the desired result. The product of this step is 2,2'-dialkoxy-4,4'-diaminobenzil.

The following steps, in which the starting material is 2-methoxy-4-nitrotoluene, will illustrate the above described overall process. The preparation of specific compounds, illustrative of the new compounds provided by the invention, is also demonstrated by these steps or examples. The initial underlined compound is the product of the step immediately following it.

A. *2,2'-dimethoxy-4,4'-dinitrobibenzyl*

A mixture of 10 grams of 2-methoxy-4-nitrotoluene, 200 cc. of 33 per cent methanolic KOH, and one gram of benzoquinone was stirred at room temperature while air was bubbled through the solution. After seven hours the product of the reaction was filtered off, washed with dilute HCl, water, hot methanol. Stilbene (2,2'-dimethoxy-4,4'-dinitrostilbene) may also be present in this product. The bibenzyl compound, recrystallized from ethyl acetate, melted at 179° C.

B. *Alpha, beta-dibromo-2,2'-dimethoxy-4,4'-dinitrobibenzyl*

Ten grams of the product of step A, 200 cc. of glacial acetic acid, and 5 cc. of bromine were refluxed for two hours. The reaction mixture was cooled and the crystalline material melting at 247–249° C. was collected. Any stilbene present in the product of step A will not affect the present step as both the stilbene and the bibenzyl form the dibromo compound underlined above.

C. *Alpha,beta-diacetoxy-2,2'-dimethoxy-4,4'-dinitrobibenzyl*

Ten grams of silver acetate in a mixture of 250 cc. of glacial acetic acid and 30 cc. acetic anhydride were refluxed for one hour. To it 8.5 grams of the product of step B was added all at once. The mixture was refluxed for 16 hours, cooled, and the precipitate filtered off and discarded. The filtrate was poured in ice water from which the crude product was obtained. It was recrystallized from ethanol and melted at 190–192° C.

D. *2,2'-dimethoxy-4,4'-dinitrohydrobenzoin*

To 6.7 grams of crude product from step C in 400 cc. of methanol, 17.5 cc. of 15% NaOH was added. The mixture was shaken for 15 minutes. During this period most of the solid material originally in suspension went into solution. The undissolved material was then filtered off and discarded. The filtrate was poured into about two liters of water containing enough acetic acid to make the solution acid to litmus. The precipitate was collected and recrystallized from ethanol. It melted at 188° C.–190° C.

E. *2,2'-dimethoxy-4,4'-dinitrobenzil*

4.4 grams of the product of step D in 20 cc. of nitric acid (conc.) were heated for six hours on the steam bath. The product of the reaction was poured over ice, filtered, washed with sodium bicarbonate solution, then with water. It was recrystallized from a mixture of ethanol and ethyl acetate. M. P. 179–180° C.

F. *2,2'-dimethoxy-4,4'-diaminobenzil*

1.14 grams of the product from step E in 100 cc. of ethanol were reduced in an Adam's shaker with hydrogen, using palladium on charcoal as a catalyst. The solid material which separated was filtered off, dissolved in dilute HCl, precipitated with sodium carbonate and recrystallized from ethanol. It melted at 231–233° C.

The following example illustrates another type of compound, and its preparation, which is provided by the invention:

G. *2,2'-dimethoxy-4,4'-diaminohydrobenzoin*

Two grams of the product from step D were dissolved in 60 cc. of ethanol and reduced with platinum oxide catalyst at room temperature and atmospheric pressure. The catalyst was filtered off and the product crystallized from ethanol. It melted at 152° C.

The products of step F, and also of step C, are therapeutically active against the virulent strain of *M. tuberculosis*. The latter product also exhibits activity against the micro-organism *Trichomonas vaginalis*, as does the product of step E. In addition, the products of steps C to G are useful as intermediates.

In the light of the foregoing description, the following is claimed:

1. A 1,2-di(o-alkoxy - p - nitrophenyl)ethane compound in which each ethane carbon atom is substituted by an acyloxy group, said alkoxy group having from 1 to 7 carbon atoms and consisting of the group RO— in which R is a hydrocarbon moiety selected from the class consisting of alkyl and phenyl, and said acyloxy group having from 1 to 7 carbon atoms exclusive of the carbonyl carbon and consisting of the group RCOO— in which R is a hydrocarbon moiety selected from the class consisting of alkyl and phenyl.

2. Alpha,beta-diacetoxy-2,2'-dimethoxy - 4,4'-dinitrobibenzyl.

GINO R. TREVES.

REFERENCES CITED

The following references are of record in the file of this patent:

UNITED STATES PATENTS

| Number | Name | Date |
|---|---|---|
| 2,359,280 | Anderson | Oct. 3, 1944 |

FOREIGN PATENTS

| Number | Country | Date |
|---|---|---|
| 566,521 | Germany | Dec. 17, 1932 |

OTHER REFERENCES

Winstein et al.: J. A. C. S., vol. 68, pp. 119–122 (1946).

Green et al.: J. Chem. Soc., vol. 93, pp. 1721–1726 (1908).

Kuhn et al.: Berchite, vol. 76B, pp. 405–412 (1943).

Ashley et al.: J. Chem. Soc., 1946, pp. 567–572.

Fieser et al.: "Organic Chemistry," Heath and Co., Boston, Mass., 1944, pp. 720–721.